United States Patent [19]

Mitchell

[11] 4,040,465
[45] * Aug. 9, 1977

[54] WHEEL RIM ASSEMBLIES

[75] Inventor: William Eric Mitchell, Coventry, England

[73] Assignee: Dunlop Limited, London, England

[*] Notice: The portion of the term of this patent subsequent to Nov. 11, 1992, has been disclaimed.

[21] Appl. No.: 483,023

[22] Filed: June 25, 1974

[30] Foreign Application Priority Data

June 30, 1973 United Kingdom ............... 31287/73

[51] Int. Cl.² .............................................. B60C 25/12
[52] U.S. Cl. .......................... 152/381.1; 29/DIG. 3; 29/159.1; 152/381.2; 29/505; 29/526; 29/521
[58] Field of Search .............. 152/362, 396, 366, 381, 152/389, 375, 378, 379, 381, 385, 330, 399, 400, 158; 301/5 R, 39 R, 63 R, 95, 96, 97, 98; 29/DIG. 3, 159; 24/20 CW

[56] References Cited

U.S. PATENT DOCUMENTS

| 449,650 | 3/1891 | Jeffries | 152/389 |
| 715,430 | 12/1902 | Seiberling | 152/366 |
| 1,805,797 | 5/1931 | Bates | 24/20 |
| 1,836,676 | 12/1931 | Main | 152/381 R |
| 2,440,740 | 5/1948 | Daddio | 152/400 |
| 2,840,133 | 6/1958 | Billingsley | 152/396 |
| 3,857,429 | 12/1974 | Edwards | 152/362 R |
| 3,918,508 | 11/1975 | Mitchell | 152/400 |
| B 522,537 | 3/1976 | Mitchell | 152/379 S |

FOREIGN PATENT DOCUMENTS

| 2,183,094 | 4/1973 | France | 152/396 |
| 667,763 | 10/1929 | France | 152/396 |

Primary Examiner—Robert B. Reeves
Assistant Examiner—H. Grant Skaggs
Attorney, Agent, or Firm—Stevens, Davis, Miller & Mosher

[57] ABSTRACT

A wheel rim assembly comprising a rim having a well disposed between tire bead seats, a well cover band arranged to extend circumferentially around the well so as to prevent a tire bead from entering the well, the cover band being split at one side of its circumference, and a link of deformable material to connect the ends of the band, link having sufficient rigidity to hold the ends of the band against circumferential displacement relative to one another after deformation of the link to secure and tension the band around the well.

3 Claims, 8 Drawing Figures

WHEEL RIM ASSEMBLIES

This invention relates to wheel rim assemblies.

In the event of the sudden deflation of a pneumatic tire on a moving vehicle the beads of the tire are liable to be axially displaced from their bead seats and in the case of a tire mounted on a well base rim a displaced tire bead may enter the well. In this condition, the steering control of the vehicle is severely impaired and the tire may even be dragged completely off the rim.

One object of the present invention is to provide a well cover band which can easily be assembled and removed from the rim.

According to one aspect of the invention, a wheel rim assembly comprises a rim having a well disposed between tire bead seats, a well cover band arranged to extend circumferentially around the well so as to prevent a tire bead from entering the well, the cover band being split at one point of its circumference, and a link of deformable material to connect the ends of the band, the link having sufficient rigidity to hold the ends of the band against circumferential displacement relative to one another after deformation of the link to secure and tension the band around the well.

According to a further aspect of the invention a well cover band for use in a wheel rim assembly comprises a cover band split at one point of its circumference and a link of deformable material connected to the ends of the band, the link having sufficient rigidity to hold the ends of the band against circumferential displacement relative to one another after deformation of the link to secure and tension the band around the well.

Preferably, the link is formed from a piece of stiff wire hooked at its opposite ends into slots or holes formed in the respective ends of the band. Deformation of a wire link of this kind may be achieved by applying torque to a portion spanning a gap between the ends of the band so as to produce a kink in the wire. Such deformation may be carried out by the use of a slotted tool after the band and a tire have been assembled on the rim, and the slotted tool may be arranged to have a limited angular movement between the ends of the band so as to provide a kink of predetermined dimensions.

The invention also provides a method of securing a well cover band around the well of a well-base rim, said method comprising the steps of locating in position around the well a well cover band split at one point of its circumference, attaching a link of deformable material to the ends of the band, and deforming the link to tension the band around the well.

Two embodiments of the invention will now be described with reference to the accompanying drawings in which.

Figure 1:
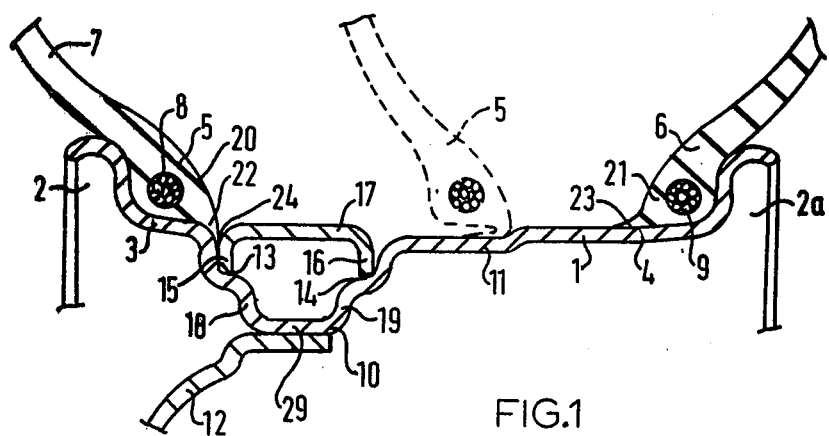
FIG. 1 is an axial cross-sectional view of part of a wheel and tire assembly incorporating a well cover band.

In the wheel and tire assembly shown in FIG. 1, a wheel rim 1 comprises two bead retaining flanges 2 and 2a and bead seats 3 and 4 which support the beads 5 and 6 of an associated pneumatic tire 7, the beads being reinforced by inextensible bead wires 8 and 9.

The wheel and tire assembly is also described in our co-pending U.S. Patent application Ser. No. 420,596 filed November 30, 1973.

The rim also comprises a well 10, and a central base portion 11 which is slightly radially inwardly depressed relative to the bead seats, the rim being welded to a disc portion 12 of conventional form.

The sides 18 and 19 of the well 10 are provided with axially projecting and circumferentially extending ledges 13 and 14 which extend around the whole periphery of the rim and are arranged to support the radially inwardly turned edges 15 and 16 of a cover band 17 formed from steel. The band 17 is split at one point in its circumference to enable it to be placed in position as shown in FIG. 1 after the inboard bead 6 has been seated and the outboard bead moved axially to a position clear of the well 10 as shown in dotted lines in FIG. 1. The ends of the band are connected as shown in FIG. 2 by a link 40 made from stiff steel wire 3.18 millimetres (one-eighth of an inch) in diameter and hooked at its ends 41 and 42 through slots 43 and 44 formed respectively in the end portions 45,45a of the band 17.

Figure 2:
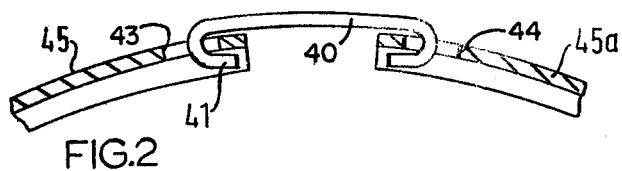
FIG. 2 is a cross-sectional view as seen in the axial direction showing means connecting the ends of the cover band of FIG. 1.
Figure 3:
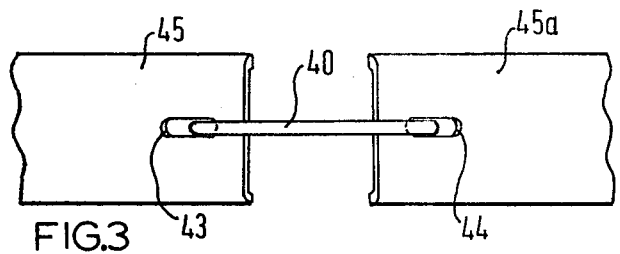
FIG. 3 is a plan view as seen in the radial direction looking towards the axis of the wheel of the arrangement shown in FIG. 2.
Figure 4:
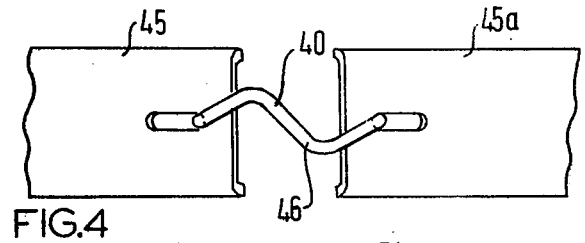
FIG. 4 is a view corresponding to FIG. 3, showing the tightened state of the band.

FIGS. 2 and 3 show the link 40 in its undeformed state, after inserting the hooked portions 41 and 42 into the slots 43 and 44 to secure the band 17 in position around the wheel rim well as shown in FIG. 1, but in order to hold the band 17 firmly in position the link 40 is subsequently deformed to a Z shape incorporating a kink 46 as shown in FIG. 4. This is very easily accomplished by the use of a tool of the kind shown in FIGS. 5 and 6, which consists of an L-shaped handle 47 on which a square block 48 is formed, the block 48 having a slot 49 having a slightly greater width than the diameter of the wire forming the link 40 and having rounded ends 50.

Figure 5:
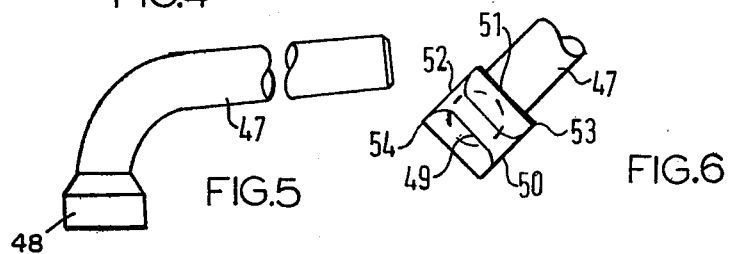
FIG. 5 is a side view of a tool for tightening the band.
Figure 6:
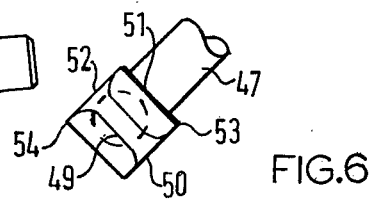
FIG. 6 is a view in the direction of the arrow 'A' of part of the tool shown in FIG. 5.

By suitable choice of dimensions for the sides 51, 52 of the block 48 and the undeformed length of the link 40 in relation to the desired final spacing of the ends of the band 45, it is possible to arrange that when the tool shown in FIGS. 5 and 6 is engaged with the link passing through the slot 49 the handle 47 can only be turned until the outer corners 53,54 of the tool abut the respective ends of the band. This serves to limit the angle through which the tool can be rotated and thus enables a predetermined degree of tightening of the band to be achieved.

Figure 7:
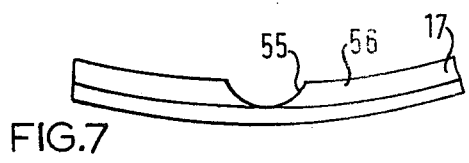
FIG. 7 is a view in the axial direction showing a part of the band.

FIG. 7 shows a part of the band diametrically opposite the joint between its edges, in which a semicircular notch 55 is formed in each of the radially inwardly turned edges 56. The notches 55 weaken the band and thus render it easier to fit to the rim.

When the band 17 is secured in position its rounded outer edge, in conjunction with the rounded edge of the rim well 10, forms a groove 24 of radially inwardly tapering cross-section into which an extending lip 22 of the tire bead 5 is arranged to project. The engagement of the lip 22 in the groove 24 has an important function in preventing axial movement of the bead 6 when the tire runs in a deflated condition, and it will therefore be seen that the band 17 has a dual function in that it not only prevents the beads from entering the well, but also improves the stability of a deflated tire by holding the outboard tire bead on its seat.

Figure 8:
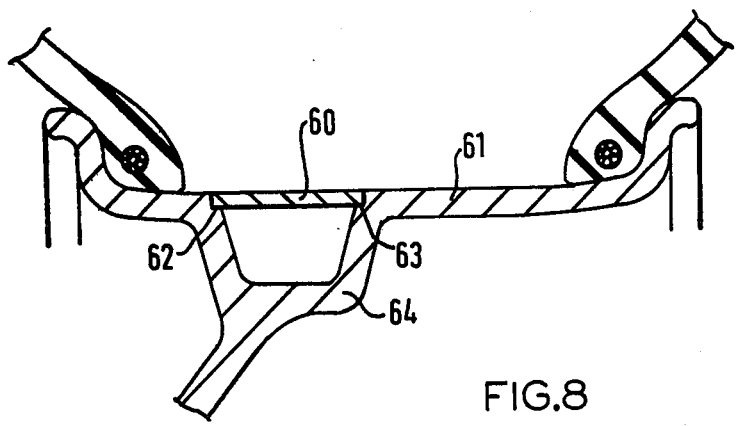
FIG. 8 is a similar view to that of FIG. 1, showing a modified assembly.

The present invention is not restricted to the provision of well cover bands having the dual function described above, but may also be employed in connection with well cover bands having only the function of preventing the tire beads from entering the well, such as the band 50 shown in FIG. 8 in position on a rim 61. The band 60 is of flat rectangular-section strip steel and rests on shoulders 62 and 63 formed, e.g. by machining, at the opening to a well 64, and is split at one point of its circumference and joined by a wire link as shown in FIGS. 2-4.

The fastening means in the embodiments described above is particularly cheap, easy to assemble, and reliable both in assembly and in subsequent operation.

While a simple wire link having a single kink is described above, the link may be of metal strip material or of any other suitable material. The deformation may take the form of a kink or kinks of any desired contour including part-circular arcs or closed loops or twists. Multiple kinks or crimps may be employed to shorten the length of the link in order to tension the band.

Having now described my invention, what I claim is:

1. A method for securing a well cover band around the well of a well base rim comprising the steps of locating in position around the well, a well cover band split at one point of its circumference, attaching a link of deformable material to the ends of the band, locating a slotted tool in the gap between the ends of the band, rotating the tool to deform the link to produce a kink in the link and thereby reduce the effective length of the link to tension the band around the well, the tool being arranged to have limited angular movement between the ends of the band so as to provide a kink of predetermined dimensions.

2. A wheel rim assembly comprising a rim having a well disposed between tire bead seats, a well cover band arranged to extend circumferentially around the well so as to prevent a tire bead from entering the well, the well cover band defining in combination with the rim a circumferential groove adjacent one bead seat, the groove being arranged to receive an extended toe of the associated tire bead when a tire is mounted thereon to prevent axial inward displacement of the bead, the well cover band being provided with radially inwardly turned edges which are arranged to rest on circumferentially extending step portion formed one on each side of the well, the cover band being split at one side of its circumference, and a link of deformable material to connect the ends of the band, the link having sufficient rigidity to hold the ends of the band against circumferential displacement relative to one another after deformation of the link to secure and tension the band around the well.

3. A wheel rim assembly according to claim 2 wherein the circumferentially extending groove in which the toe of an associated tire bead may be located is formed by the side of the well adjacent the outboard tire bead and the adjacent radially inwardly turned edge of the band.

* * * * *